United States Patent [19]
English et al.

[11] Patent Number: 6,021,999
[45] Date of Patent: Feb. 8, 2000

[54] BOUNCE SUPPRESSION DEVICE FOR HIGH SPEED POPPET VALVE

[75] Inventors: Paul R. English, Washington; David M. Olson, Peoria Heights, both of Ill.

[73] Assignee: Caterpillar Inc., Peoria, Ill.

[21] Appl. No.: 09/132,645

[22] Filed: Aug. 11, 1998

[51] Int. Cl.$^7$ ............................ F16K 31/00; F02M 41/00
[52] U.S. Cl. ............................................. 251/64; 123/467
[58] Field of Search ................................. 251/64; 123/467

[56] References Cited

U.S. PATENT DOCUMENTS

| | | | |
|---|---|---|---|
| 4,126,152 | 11/1978 | Kirk | 137/85 |
| 4,246,876 | 1/1981 | Bouwkamp et al. | 123/467 |
| 4,481,974 | 11/1984 | Schmitt et al. | 137/514 |
| 5,427,352 | 6/1995 | Brehm | 251/64 |
| 5,485,957 | 1/1996 | Sturman | 239/88 |
| 5,538,332 | 7/1996 | Carroll | 303/28 |
| 5,553,829 | 9/1996 | Hemsen | 251/129.21 |

Primary Examiner—Steven A. Bratlie
Attorney, Agent, or Firm—Fred J. Baehr

[57] ABSTRACT

A bounce depression device 29 for a high speed poppet valve 11 in a electronically controlled hydraulically operated unit fuel injector 1 comprises a poppet valve 11 with a central bore 35 and a counter bore 33 having a flat inner end 37 and a annular grove 39 on the other end which receives a retainer ring 41 that holds a plurality of flat washer shaped damping rings 31 in the counter bore 33 to absorb momentum by rattling and bouncing as the poppet valve 11 seats to prevent the poppet valve 11 bouncing off the seats 13 and 15.

10 Claims, 3 Drawing Sheets

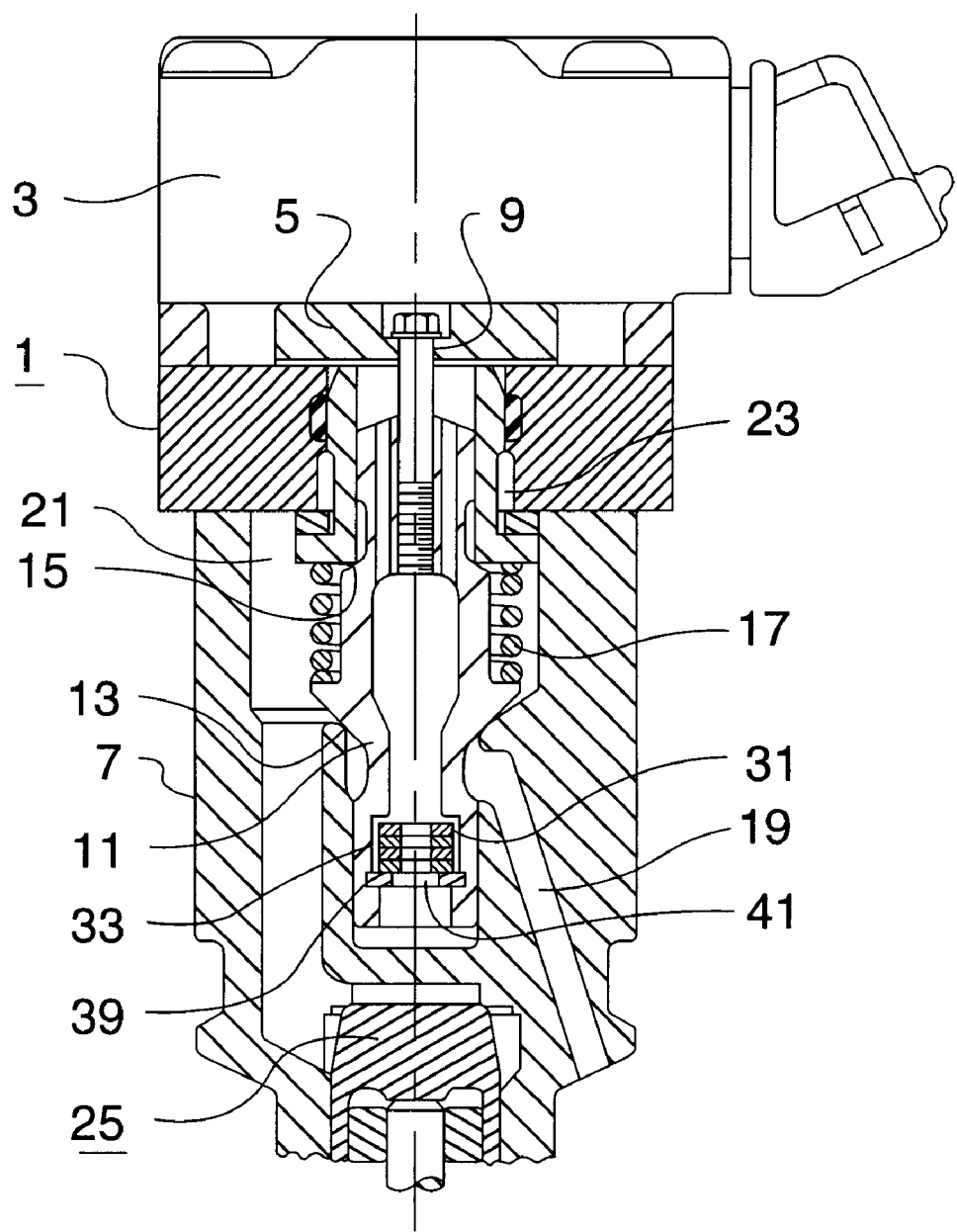
Fig_2_

Fig_3.
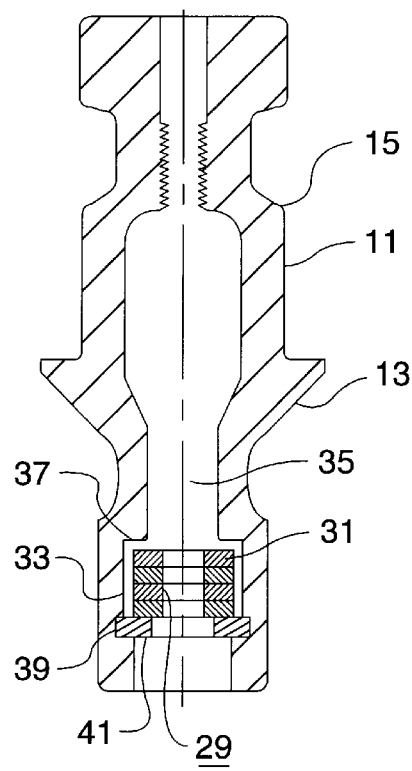
Fig_4.
Fig_5.
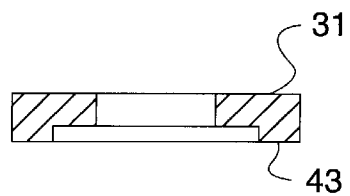

BOUNCE SUPPRESSION DEVICE FOR HIGH SPEED POPPET VALVE

TECHNICAL FIELD

The invention relates to a poppet valve and more particularly to a bounce suppressor for a poppet valve in an electronically controlled hydraulically operated unit fuel injector.

BACKGROUND ART

Electronically controlled hydraulically operates unit fuel injectors utilize poppet valves to control the flow of highly pressurized working fluid to operate the injectors. The poppet valves must close quickly and seal immediately. Any bounce of the poppet valve when seating is equivalent to a leak and causes delayed injection in the fuel injectors. U.S. Pat. No. 5,427,352 describes an electromagnetic valve having a movable armature with a hollow compartment containing a plurality of spherical shot, which form a damping mass within the armature.

DISCLOSURE OF THE INVENTION

Among the objects of this invention may be noted the provision of a damping device within a poppet valve which absorbs momentum upon the valve seating to prevent the momentum from causing the poppet valve to bounce upon seating.

In general, abounce suppression device for a high speed poppet valve disposed in an electronically controlled hydraulically operated unit fuel injector, when made in accordance with this invention, comprises a poppet valve with a first and second seat and a central bore, a counter bore having a flat inner end, and an annular groove disposed in the counter bore. A plurality of damping rings are disposed in the counter bore forming a stack of damper rings. A flat retainer ring disposed in the annular groove holds the damping rings in the counter bore, whereby the damping rings bounce and rattle within the counter bore to absorb momentum and prevent the poppet valve from bouncing off the seat as the popper valve moves very rapidly from one seat to the other during the operation of the injector.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

FIG. 2 is an enlarged sectional view of the upper portion of the injector containing the poppet valve;

FIG. 3 is an enlarged sectional view of the poppet valve;

FIG. 4 is an enlarged sectional view of a typical damping ring utilized in the damping device; and FIG. 5 is an enlarged sectional view of an alternative damping ring utilized in the damping device.

BEST MODE FOR CARRYING OUT THE INVENTION

Figure 1:
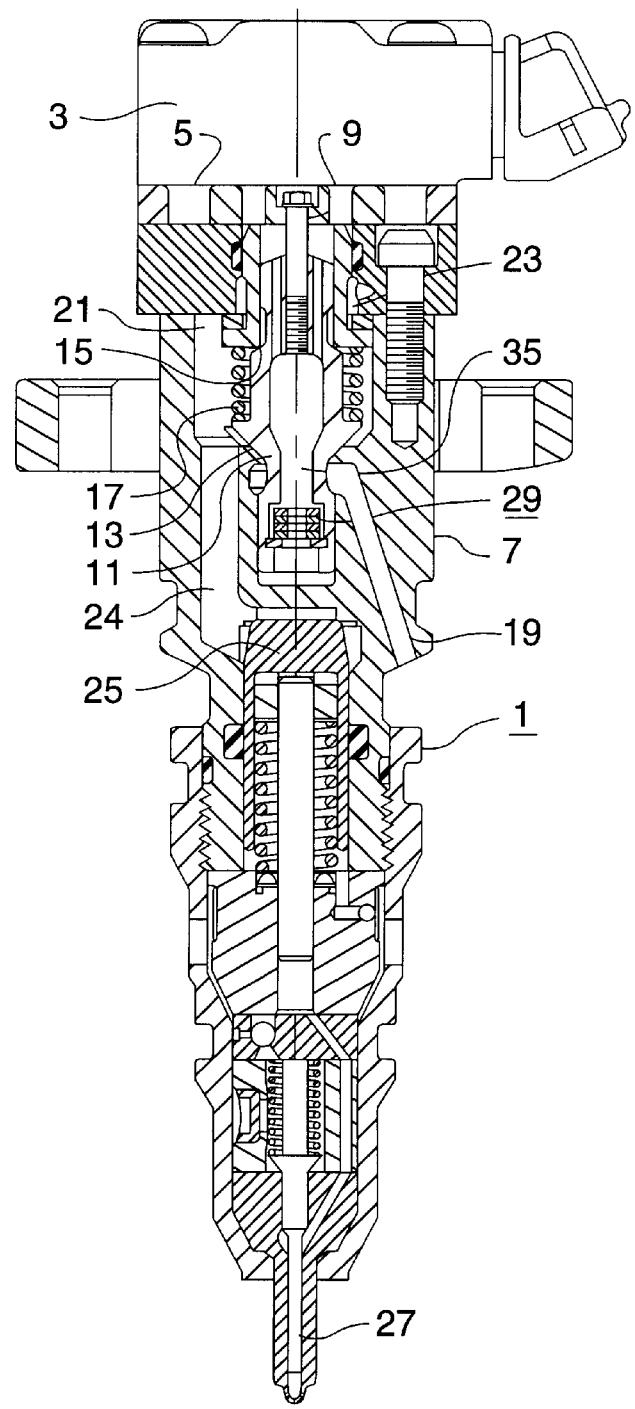
FIG. 1 is sectional view of an electronically controlled hydraulically operated unit fuel injector having a poppet valve with a damping device made in accordance with this invention.

Referring now to the drawings in detail and in particular to FIG. 1, there is shown an electronically controlled hydraulically operated unit fuel injector 1 comprising a stator 3 and an armature 5 disposed at the upper end of an elongated tubular housing 7. The stator 3 has a conductive coil(not shown) disposed therein to form a electromagnet, which when energized draws the armature 5 to the stator 3. A bolt 9 connects the armature 5 to a poppet valve 11 disposed within the housing 7. The poppet valve 11 comprises a first or lower seat 13 and a second or upper seat 15. A coil spring 17 biases the poppet valve downwardly seating the first seat 13 and closing off a high pressure working fluid inlet port 19. The second or upper seat is not seated, thus opening an interior upper portion 21 of the tubular housing 7 to a drain port 23 to drain excessive working fluid from the housing 7. When the stator 3 is energized, the armature 5 is drawn to the stator 3, compressing the spring 17 and moving the poppet valve 11 off the lower seat 13 and seating the upper seat 15 shutting off the flow of working fluid to the drain port 23 and allowing the high pressure working fluid to enter a lower interior portion 24 of the tubular housing 7 and operate an intensifier piston 25. The intensifier piston 25 pressurizes or intensifies the pressure of the fuel fed thereto to a pressure significant higher than the pressure of the working fluid. The highly pressurized fuel operates a needle valve 27 allowing the pressurized fuel to be injected into an associated engine cylinder (not shown).

A bounce suppression device 29 for the high speed poppet valve 11, shown best in FIG. 3, comprises a plurality of washer shaped damping rings 31 disposed in a counter bore 33 in a central bore 35 of the poppet valve 11. The counter bore 33 has a flat inner end 37 and an annular groove 39 adjacent the other end of the counter bore 33. The annular groove 39 receives a flat retainer ring 41 adapted to hold the damping rings 31 in the counter bore 33. The outer diameter of the damping rings 31 is smaller than the diameter of the counter bore 33, providing a loose fit between the counter bore 33 and the damping rings 31. The damping rings 31 are so disposed in the counter bore 33 to form a stack of damping rings having a height which is slightly less then the distance between the retainer ring 41 and the flat inner end 37 of the counter bore 33, forming a close fit between the flat inner end 37 of the counter bore 33 and the retainer ring 41. The damping rings 31 being so disposed in the counter bore 33 allows the damping rings 31 to bounce and rattle within the counter bore 33 to absorb momentum and prevent the poppet valve 11 from bouncing off the seat 13 or 15 as the poppet valve moves rapidly one seat 13 or 15 to the other seat 15 or 13 respectively during the operation of the injector 1. The clearance between the stack of damping rings 31 and the flat end 37 of the counter bore 33 and retainer ring 41 must cooperate with the clearance with the outside diameter of the damping rings 31 and the diameter of the counter bore 33 along with the proper mass of the damping rings 31 to suppress the bounce of the poppet valve 11.

FIG. 4 shows the damping rings 31 shaped like flat washers with square edges.

FIG. 5 shows the damping rings 31 shaped like flat washers with a lip 43 extending from the outer peripheral edge. The central bore 35 and counter bore 33 of the poppet valve 11 is filled with working fluid, which dampens the movement of the damping rings 31. The lip 43 allows freer flow of the working fluid between the damping rings 31, as the lip 43 provides a means for allowing the damping rings to stand off of each other.

While the preferred embodiments described herein set forth the best mode to practice this invention presently contemplated by the inventors, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

Industrial Applicability

A bounce suppression device 29 for a high speed poppet valve 11 utilized in an electronically controlled hydraulically operated unit fuel injector 1 when made in accordance with this invention advantageously provides a plurality of damping rings captured in a counter bore of a high speed poppet which rattle and bounce, absorbing momentum as the valve is seated, thus preventing the poppet valve from bouncing off the seat after the valve is seated which causes delayed injection in fuel injectors.

What is claimed is:

1. A bounce suppression device 29 for a high speed poppet valve 11 disposed in an electronically controlled hydraulically operated unit fuel injector 1 comprising a poppet valve 11 with a first and second seat 13 and 15 and a central bore 35, a counter bore 33 having a flat inner end 37, an annular groove 39 disposed in the counter bore 33, a plurality of damping rings 31 disposed in the counter bore 33 forming a stack of damping rings 31 and a flat retainer ring 41 disposed in the annular groove 39 to hold the damping rings in the counter bore 33, whereby the damping rings 31 bounce and rattle within the counter bore 33 to absorb momentum and prevent the poppet valve 11 from bouncing off the seat 13 and 15 as the poppet valve 11 moves very rapidly from one seat 13 to the other seat 15 during the operation of the injector 1.

2. The bounce suppression device 29 as set forth in claim 1, wherein the outer diameter of the damping rings 31 is smaller than the inner diameter of the counter bore 33, providing a loose fit between the counter bore 33 and the damping rings 31.

3. The bounce suppression device 29 as set forth in claim 2, wherein the height of the stack of damping rings 31 is only slightly less than the distance between the retainer ring 41 and the flat inner end 37 of the counter bore 33 providing a close fit between the stack of damping rings 31 and the flat end 37 of the counter bore 33 and the retainer ring 41.

4. The bounce suppression device 29 as set forth in claim 1, wherein the damping rings 31 are generally shaped like flat washers.

5. The bounce suppression device 29 as set forth in claim 4, wherein the outer diameter of the damping rings 31 is smaller than the inner diameter of the counter bore 33, providing a loose fit between the counter bore 33 and the damping rings 31.

6. The bounce suppression device 29 as set forth in claim 5, wherein the height of the stack of damping rings 31 is only slightly less than the distance between the retainer ring 41 and the flat inner end 37 of the counter bore 33 providing a close fit between the stack of damping rings 31 and the flat end 37 of the counter bore 33 and the retainer ring 41.

7. The bounce suppression device 29 as set forth in claim 1, wherein the damping rings 31 are shaped like flat washers with a lip 43 extending from the outer peripheral edge, whereby the damping rings 31 stand off from each other.

8. The bounce suppression device 29 as set forth in claim 7, wherein the outer diameter of the damping rings 31 is smaller than the inner diameter of the counter bore 33, providing a loose fit between the counter bore 33 and the damping rings 31.

9. The bounce suppression device 29 as set forth in claim 8, wherein the height of the stack of damping rings 31 is only slightly less than the distance between the retainer ring 41 and the flat inner end 37 of the counter bore 33 providing a close fit between the stack of damping rings 31 and the flat end 37 of the counter bore 33 and the retainer ring 41.

10. The bounce suppression device 29 as set forth in claim 1, wherein the clearance between the stack of damping rings 31 and the counter bore 33 cooperates with the mass of the damping rings 31 to prevent the poppet valve 11 from bouncing off the seats 13 and 15.

* * * * *